United States Patent [19]

Kley

[11] 4,207,444
[45] Jun. 10, 1980

[54] PLANAR MULTIPLE SWITCH

[75] Inventor: Victor B. Kley, Berkeley, Calif.

[73] Assignee: Kley, Fitting, Fitting, Nalley and Smith, Berkeley, Calif.

[21] Appl. No.: 867,515

[22] Filed: Jan. 6, 1978

Related U.S. Application Data

[63] Continuation-in-part of Ser. No. 712,748, Aug. 9, 1976, Pat. No. 4,079,194.

[51] Int. Cl.² .................................................. H01H 13/70
[52] U.S. Cl. ................................. 200/5 A; 200/159 B; 200/292
[58] Field of Search ................... 200/5 R, 5 A, 159 B, 200/86 R, 292

[56] References Cited

U.S. PATENT DOCUMENTS

| | | | |
|---|---|---|---|
| 2,867,552 | 1/1959 | Homer | 428/379 X |
| 3,056,005 | 9/1962 | Larson | 200/86 R |
| 3,383,487 | 5/1968 | Wiener | 200/292 X |
| 3,617,666 | 11/1971 | Brave | 200/46 X |
| 3,676,616 | 7/1972 | Wiedmer | 200/5 R |
| 3,723,673 | 3/1973 | Clary | 200/5 A X |
| 3,761,944 | 9/1973 | Shimojo | 200/159 B X |
| 3,854,018 | 12/1974 | Reynolds et al. | 200/5 A |
| 3,996,427 | 12/1976 | Kaminski | 200/159 B |
| 4,017,697 | 4/1977 | Larson | 200/159 B X |
| 4,066,851 | 1/1978 | White et al. | 200/86 R X |
| 4,079,194 | 3/1978 | Kley | 178/18 |
| 4,090,045 | 5/1978 | Marsh | 200/5 A |

OTHER PUBLICATIONS

Standard Handbook for Electrical Engineers, Fink and Carroll, Tenth Edition, McGraw Hill, Chapter 2, "Electric and Magnetic Circuits", pp. 2-28 to 2-31, Sec. 2-116.
IBM Tech. Disc. Bull., Lester et al., "Switch", vol. 11, No. 11, 4-1969, p. 1569.

*Primary Examiner*—James R. Scott
*Attorney, Agent, or Firm*—O'Brien & Marks

[57] ABSTRACT

The frequency capability of a planar multiple switch for entry of digital data is improved by forming an upper conductive planar member from fine conductive elements electrically joined, such as a screen or conductor pattern, together but with sufficient space between elements to substantially reduce capacitive coupling between the upper member and lower contact members. Further, multiple bit switch areas are formed adjacent single bit switch areas; and coded contact areas are formed on parallel lines by placing insulation on selected sections of lines and building up adjacent contact sections by additional conductor material.

6 Claims, 16 Drawing Figures

PLANAR MULTIPLE SWITCH

CROSS REFERENCE TO RELATED APPLICATION

This application is a continuation-in-part application of my copending application Ser. No. 712,748 filed Aug. 9, 1976 now U.S. Pat. No. 4,079,194 and which is incorporated herein by reference.

BACKGROUND OF THE INVENTION

1. Field of the Invention

The present invention relates to data-entry devices for digital systems.

2. Description of the Prior Art

The prior art, as exemplified in U.S. Pat. Nos. 3,600,528; 3,627,935; 3,641,286; 3,688,066; 3,699,294 and 3,761,944, contains a number of electrical switch devices and mechanisms some of which employ flexible or sheet-like upper conductive members which can be depressed to engage underlying conductive members laid out in patterns or separate contact areas. Prior art entry devices employing upper conductive sheets or metal films overlying contact areas to be selectively engaged are generally deficient in their ability to be employed in digital systems wherein pulses were used to sense the switch operations; modern digital circuitry employs pulses of a frequency and pulse width which are effectively shunted by capacitive coupling in such prior art devices. Additionally, prior art digital entry devices are characterized by one or more deficiencies such as being too complex and costly, being unreliable, requiring excessive time in assembly, etc.

SUMMARY OF THE INVENTION

The present invention is summarized in that a planar multiple switch device having a planar upper conductive member extending over lower contact members is substantially improved in frequency response by forming the upper member from fine conductive elements electrically joined together, such as in a screen, a conductor pattern, or the like, wherein the fine conductive elements are sufficiently spaced apart to substantially reduce capacitive coupling between the upper member and the lower contact members.

An object of the present invention is to construct a planar multiple switch device suitable for being pulsed by digital electronic equipment.

Another object of the invention is to construct a planar multiple switch device at a lower cost and more simply than was heretofore possible.

One advantage of the invention is that capacitive coupling between switch contact members is substantially reduced by forming one or both of the contact members from connected conductor elements which are relatively fine and are spaced sufficiently apart to substantially reduce capacitive coupling.

Another feature of the invention is the provision of a planar multiple switch device in which a plurality of conductive contact areas are laid out in a single integrated pattern without spacers so that depression of an overlying conductor produces operation at any depressed portion.

Still another feature of the invention contemplates the forming of contact areas on a continuous pattern of parallel lines by selectively covering sections of one or more of the parallel lines with an insulative material and then raising the conductors adjacent to the insulation covered lines by additional conductive material.

Other objects, advantages and features of the invention will be apparent from the following description of the preferred embodiment taken in conjunction with the accompanying drawings.

DESCRIPTION OF THE PREFERRED EMBODIMENT

Figure 1:
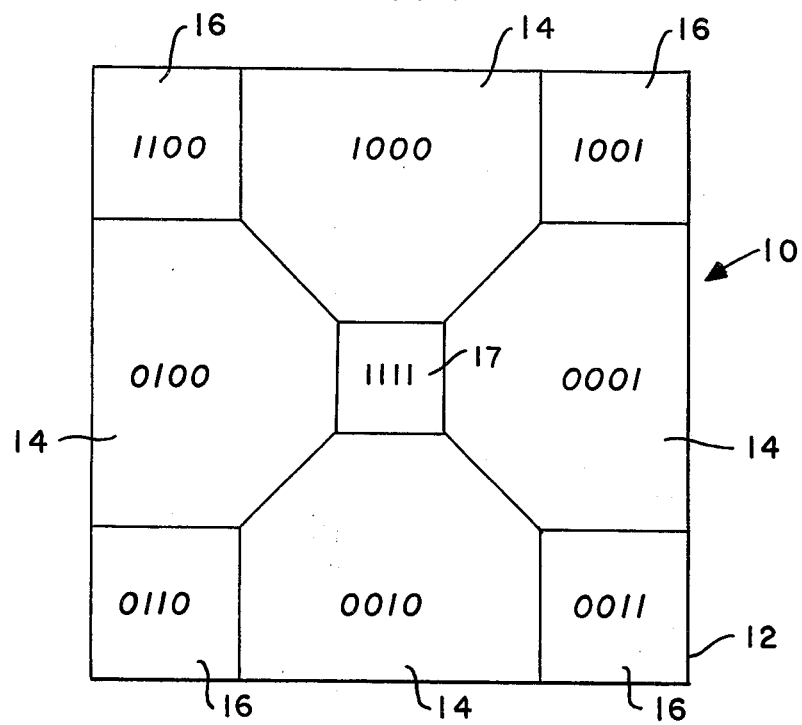
FIG. 1 is a plan view of a planar multiple switch constructed in accordance with the invention.
Figure 2:
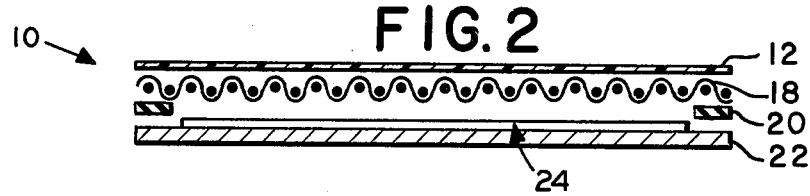
FIG. 2 is an exploded cross section view of the multiple switch of FIG. 1.

The invention is embodied in a planar multiple switch indicated generally at 10 in FIGS. 1 and 2 and including a top cover 12, an upper conductive member 18, a spacer 20 and a bottom substrate 22 with a conductive contact pattern 24 formed on the top face thereof.

The top sheet 12 is formed from a flexible thermoplastic film having indicia printed thereon dividing the top surface into four single-bit areas 14, four double-bit areas 16, and one four-bit area 17. As can be seen from the printed binary codes, each of the double-bit areas 16 is located between a pair of the single-bit areas 14 and corresponds to a combination of the two single-bits of the adjacent single bit areas while the four-bit area 17 is a combination of all of the single-bit areas 14 and is located centrally therebetween. Although the indicia printed on cover 12 corresponds to binary numbers, other indicia describing a desired function, etc., may be printed thereon, or the cover may be free of indicia where the planar switch is to be used with some other control apparatus such as a joy stick or the like.

Figure 4:
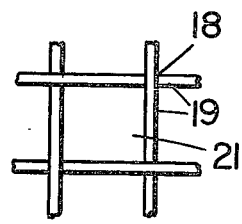
FIG. 4 is a plan view of a broken away portion of an upper conductive member of the multiple switch of FIG. 1.
Figure 5:
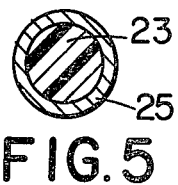
FIG. 5 is an enlarged cross section view through one conductive element of the upper member shown in FIG. 4.

The conductive member 18 is a flexible screen or mesh member which, as shown in FIG. 4, is formed from a plurality of electrically conductive members 19 electrically connected together. The elements 19 are relatively fine or narrow and are spaced apart so as to leave voids or spaces 21 therebetween which are greater than the area occupied by the elements 19. The spacing of the elements 19 to form the spaces 21 is selected to be sufficient to substantially reduce the capacitive coupling of the member 18 with the underlying conductive pattern 24. Where reduction in capacitive coupling between the conductive member 18 and conductive pattern 24 is not desired or needed, the upper member 18 may be a film or coating of conductive material applied to the underside of the upper sheet 12. One suitable material for forming the upper conductive member 18 is a woven fiber mesh which is coated with metal. For example a woven mesh is formed from polyester fibers 23, FIG. 5 and is coated with nickel 25 by sputtering techniques; such screen material is used in silk screening apparatus for printing conductive patterns, the nickel coating providing a wear resistant surface as well as being used to eliminate static electric charges in such silk screening apparatus.

The spacer 20, shown in FIG. 2 as being formed from an insulating material, extends over the periphery of the pad 10 to support the conductive member 18 spaced above the conductive pattern 24. Where the spacer 20 does not engage or cross any conductor members other than the top member 18 and reduction in capacitive coupling is not needed, the spacer 20 need not be non-conductive. It is noted that no spacing means between adjacent contact areas is provided in the embodiment of FIGS. 1-5.

Figure 3:
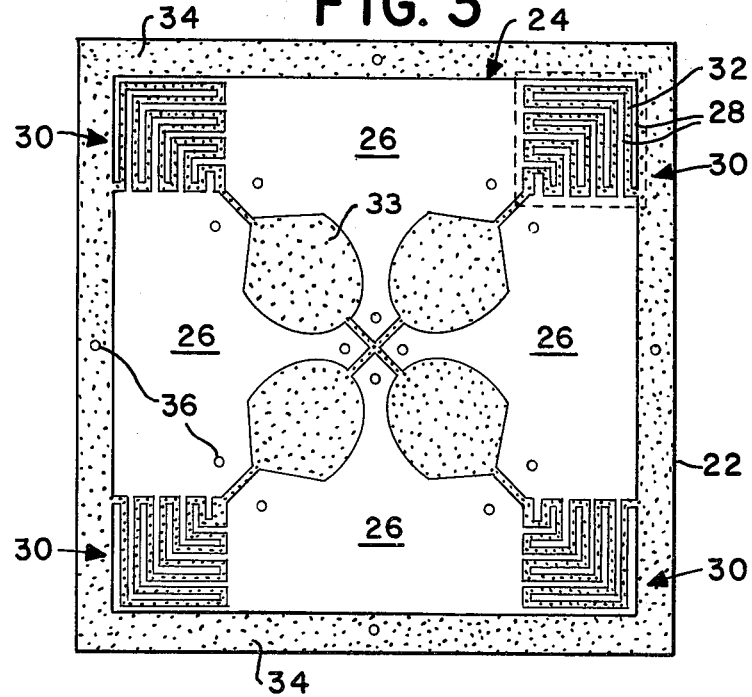
FIG. 3 is a plan view of a bottom member of the multiple switch of FIG. 1.

The substrate 20 has a rigid planar member formed of any conventional insulating material such as fiber glass, insulating plastic resin, stiff paper, or other material normally used in printed circuit boards. The conductive pattern 24 may be formed by silk screening or printing a conductive material on the top surface of the substrate in the pattern, or etching the pattern in a conductive layer laminated on the substrate 22; such processes of forming conductive patterns being well known in the art. One particularly suitable process is the deposition of a conductive pattern by silk screening an epoxy resin material containing particulate silver so as to form a pattern of conductors on the substrate 22. The pattern 24, as shown in FIG. 3 includes contact portions 26 covering a uniform region or an area corresponding to the single-bit areas 14 shown in FIG. 1. In regions or areas indicated generally at 30 between the contact areas 26, a series of thin projecting fingers 28 extend alternately from the respective adjacent single-bit contacts 26 and are closely spaced but separated by insulative regions 32. The fingers 28 must be narrow enough in width and the insulating region 32 must be thin enough so that a human finger or other object depressing the upper conductor 18 anywhere in the double-bit area overlying the areas 30 could cause contact of the conductor member 18 with fingers extending from both adjacent conductors 26. Additionally regions 33 having an absence of conductive material thereon are formed between the contacts 26 toward the center of the pad so as to provide spacing between the conductors 26 and to avoid generation of double bits when the conductors 26 are engaged towards the edge facing the opposite conductor 26. On the center top surface of the substrate 22 the conductors 26 are closely spaced to form a region where all of the conductors 26 can be engaged simultaneously by the upper member 18.

A plurality of holes 36 is provided through the substrate 32 at various locations. The holes 36 can be used for conductors to make electrical connections to the conductive member 18 or the conductive patterns 26.

The sheet 12, the upper conductive member 18, the spacer 20 and the substrate 22 with the conductive pattern 25 thereon are secured together by any suitable technique such as penetrating fasteners, screws, rivets or adhesive bonding. The conductive member 18 and upper sheet 12 are under tension so as to prevent contact of the member 18 with the conductive pattern 24 in the absence of an external force on the cover 12.

The planar multiple switch 10 is easily connected as an input to a digital circuit or microprocessor. Pulses can be applied to one or more of the conductive members 18 and 26 to provide for read out of the digital entry device. In previous switch devices, capacitive coupling between upper conductive films and lower contact patterns resulted in a limitation in the maximum frequency usable with such switch devices, i.e., short pulses which are relatively closely spaced could not be used to sense switch operation in such digital entry pads because of capacitive coupling which damped the pulses. This limitation resulted in a slow down of the digital circuitry and prevented use of the maximum input speed of the microprocessor or digital circuit. The present invention substantially improves the frequency response by providing the upper conductive member 18 with fine elements 19 which are spaced sufficiently to substantially reduce the capacity coupling.

Further the fineness of the elements 19 as well as the spaces 21 may be selected to eliminate unwanted high frequency components. For example in a system utilizing pulses of a first frequency to provide a read-out window or period for the switch and using second pulses of a much higher frequency in the digital circuitry for sequencial gating of read-out conductors, spurious signals generated by induction in the conductors can be effectively reduced or damped by the capacitive coupling to improve the performance of the microprocessor or digital circuit. For example, metal coated polyester screens of 60 mesh will damp frequenies above about 40 megahertz while such screens of 220 mesh will damp frequencies above about 1.5 megahertz.

Figure 6:
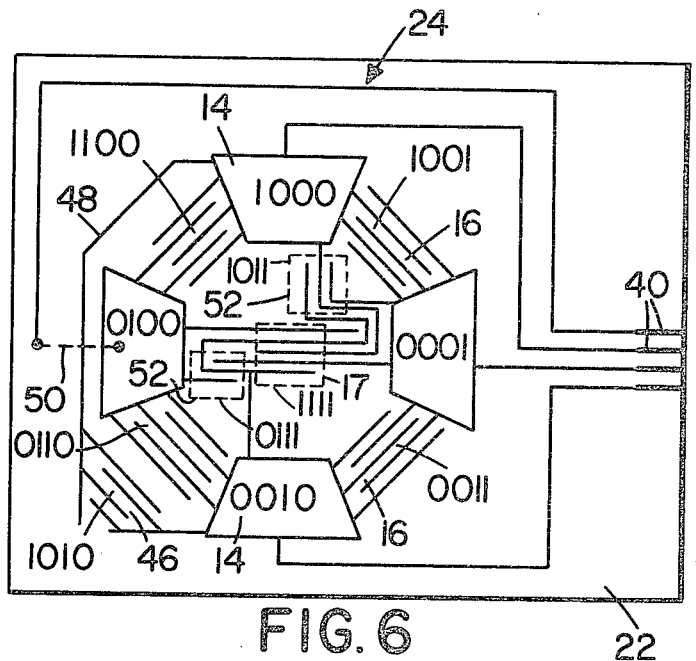
FIG. 6 is a plan view of a variation of the bottom member for employment in a planar multiple switch in accordance with the invention.
Figure 7:
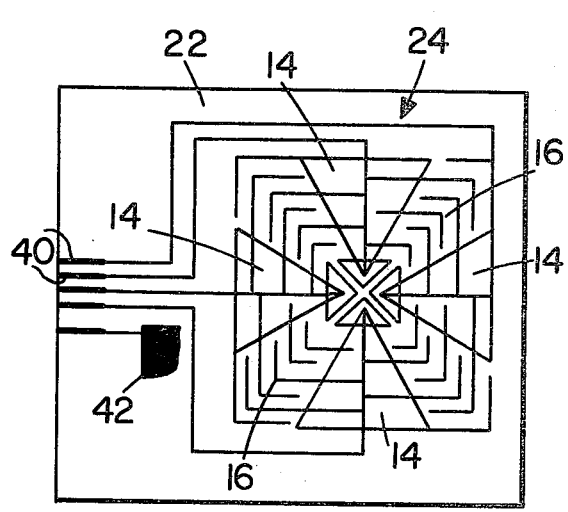
FIG. 7 is a plan view of another variation of the bottom member for employment in a planar multiple switch in accordance with the invention.
Figure 8:
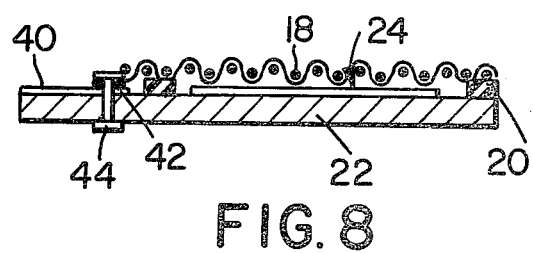
FIG. 8 is a cross section view of a planar multiple switch empolying the bottom member shown in FIG. 7.
Figure 9:
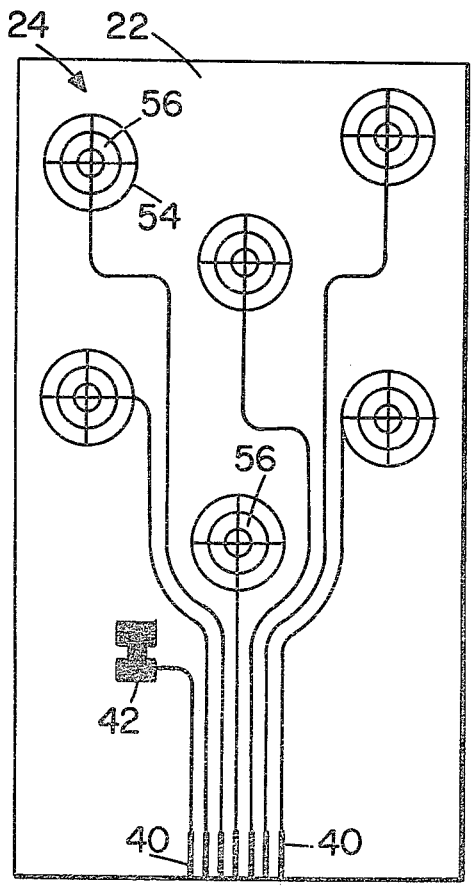
FIG. 9 is a plan view of still another variation of the bottom member for employment in a planar multiple switch in accordance with the invention.

Variations of the bottom member and the conductive patterns 24 thereon are shown in FIGS. 6, 7 and 9 wherein the same numerals are used to identify similar parts. In the variations, the conductive patterns 24 are connected to terminals 40 on the edge of the substrate 22 so that the conductive pattern 24 can be connected by a conventional printed circuit board connector or the like to digital circuitry. In the variations of FIGS. 7 and 9 a conductive area 42 is provided so that the upper member 18 can be joined to the bottom circuit pattern by means of a rivet 44 as shown in FIG. 8. The circuit pattern 24 in the variations of FIG. 6 includes an additional double-bit area 46 by running a conductor 48 from a nonadjacent area 14 to form interlaced fingers with another area 14. A conductor 50 formed on the bottom of the substrate 20 maybe used to provide crossover of the conductor 48. Additionally triple-bit areas 52 are provided in the center of the conductive pattern 24 by suitable interlaced conductors from the single bit contact areas 14. In the conductive pattern 24 of the variation of FIG. 7, the conductive areas 14 are formed by spaced conductive elements 54 which are joined together; this provides for even further increase in maximum frequency capability. The conductive pattern 24 of the variation in FIG. 9 has spaced single bit conductive areas 56 which are formed by spaced conductive elements 54 to provide improved frequency response.

Figure 10:
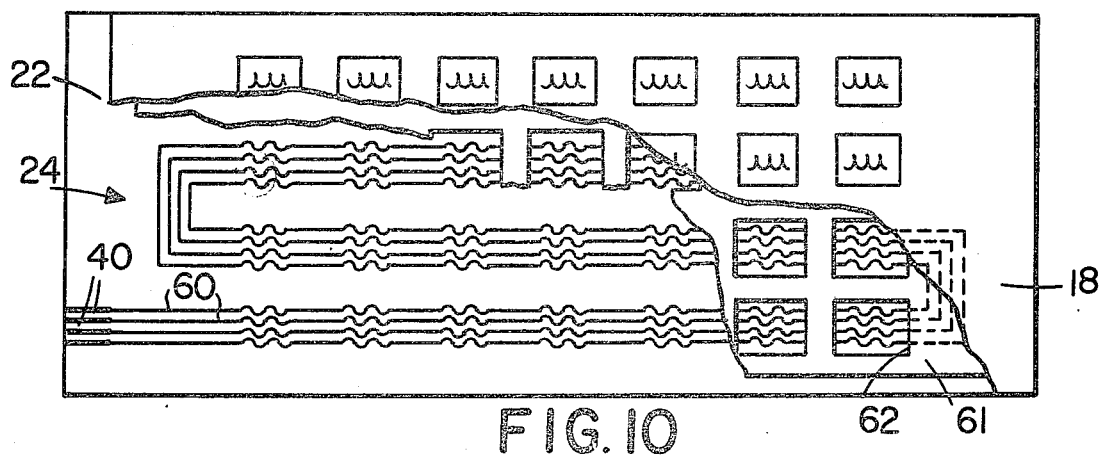
FIG. 10 is a plan view with portions broken away of a modification of the planar multiple switch in accordance with the invention.
Figure 11:
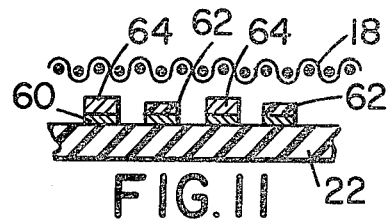
FIG. 11 is a cross section view of a broken away portion of the multiple switch shown in FIG. 10.

In FIG. 10, there is shown another variation of the planar multiple switch having a plurality of parallel conductor lines 60 placed on the substrate 22 in a serpentine pattern. A spacer 61 overlying the substrate 22 with the conductive pattern 24 thereon has windows or openings 62 formed therein exposing contact areas of the conductive pattern 24 so that the contact areas may be selectively engaged by the upper conductive member 18. At each of the contact areas, the lines 60 are formed with a wavy pattern to insure contact with the conductor member 18. As shown in FIG. 11 at the contact areas, sections of the conductors 60 are coated with electrical insulating material 62 while the remaining adjacent sections of the conductors 60 are coated or built up by additional conductive material to a height at least as great as that of the insulation 62. The insulative material 62 and the conductive material 64 are applied to the conductive pattern 24 by conventional processes such as by silk screening, applying tapes, and the like. The raised conductors 64 in the conductive pattern 24 of FIGS. 10 and 11 thus form contacts of a key board which can be operated by selective depression of the upper conductor 18.

Figure 13:
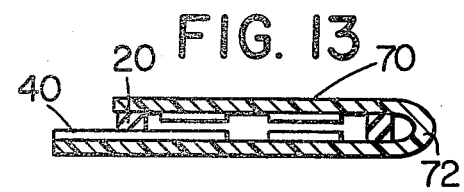
FIG. 13 is a cross section view of a planar multiple switch including the foldable member of FIG. 12.
Figure 12:
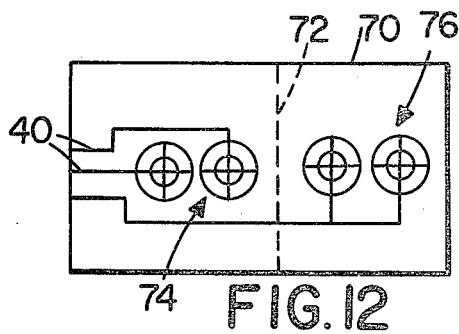
FIG. 12 is a plan view of a foldable member for employment in forming a planar multiple switch in another modification in accordance with the invention.
Figure 14:
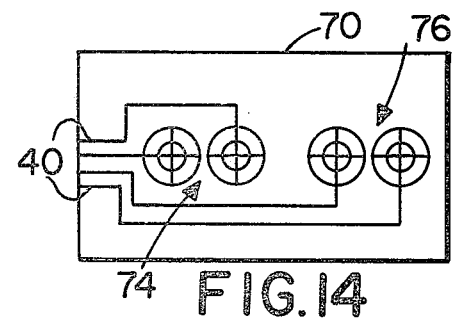
FIG. 14 is a plan view of a variation of the foldable member of FIG. 12.

A planar multiple switch including a foldable flexible substrate 70 is shown in FIGS. 12 and 13. The substrate 70 is formed from a flexible insulative material so that it may be folded at a fold line 72 to form upper and lower halves. A conductive pattern 74 similar to that of FIG. 9 but shown with only two contact areas is formed on the lower half while a second conductive complementary pattern 76 is formed on the top half. Both the conductive patterns 74 and 76 are connected to terminals 40 on one edge of the bottom half so that the entire circuit can be connected by a printed circuit board connector to digital apparatus. The circuit patterns 74 and 76 are formed from conductive elements which are electrically connected but spaced to avoid capacitive coupling. The conductive patterns on the top half 76 are shown connected to a single terminal 40 whereas in a variation in FIG. 14 the pattern 76 on the top surface forms separate conductors joined to separate terminals. In the planar multiple switch using the foldable flexible substrate 70 to form both the upper and lower halves of the switch, the spacer 20 provides the rigidity to support the upper and lower halves apart. The switch of FIG. 13 is formed by folding the substrate 70 around the spacer 20 and securing the same together so that the contact members 74 on the top surface are spaced from the contact member 74 on the bottom half. Depressing a selected area of the top or the bottom half causes engagement of a selected switch.

Figure 15:
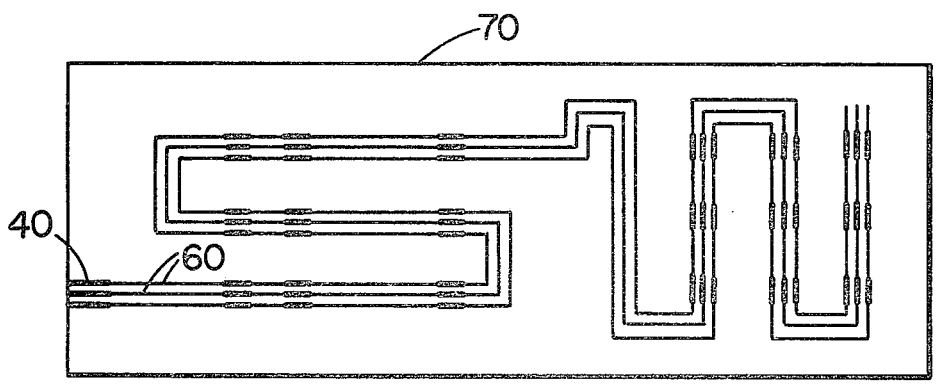
FIG. 15 is a plan view of still another variation of the foldable member of FIG. 12.
Figure 16:
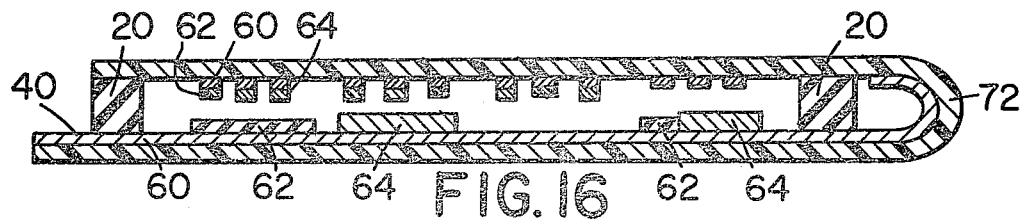
FIG. 16 is a cross section view of a planar multiple switch employing the foldable member of FIG. 15.

As illustrated in FIGS. 15 and 16 a variation of the folding substrate 70 has lines 60 of parallel conductors laid out thereon in the lower half in one direction and in the upper half in another direction so as to produce cross over areas of the conductors 60. The insulating materials 62 and the conductor materials 64 for building up the contact height are applied to selected sections of the conductors 60 either in the top or bottom half or on both halves where they cross one another so as to form an arrangement of coded switches which can be utilized to input digital data to a device.

The present planar multiple switch can be formed from transparent materials well known in the art so that it may be positioned on another device such as a cathode ray tube to permit light transmission therethrough.

Inasmuch as many modifications, variations and changes in detail are possible in the present invention, it is intended that all subject matter contained in the foregoing specification and in the accompanying drawings be interpreted as illustrative and not in a limiting sense.

What is claimed is:

1. A planar multiple switch having high frequency capability comprising
    a substrate of an electrically insulative material having a supporting face,
    a plurality of planar electrically conductive patterns mounted on the face of the substrate,
    each of said conductive patterns forming switch contact means,
    a flexible resilient electrically conductive planar member extending over the plurality of conductive patterns,
    spacing means mounting the conductive planar member above the conductive patterns so that depression of a selected portion of the conductive planar member engages such depressed portion with at least one of the conductive patterns,
    said conductive planar member being a mesh formed of fine conductive elements electrically joined together and sufficiently spaced apart to form non-conductive areas between the conductive elements such that the non-conductive areas have a size exceeding the area occupied by the conductive elements to substantially reduce capacitive coupling between the conductive planar member and the conductive patterns, and
    said mesh being formed from a non-conductive material coated with a conductive material.

2. A planar multiple switch as claimed in claim 1 wherein the mesh is a mesh of non-conductive material coated with a conductive metal.

3. A planar multiple switch as claimed in claim 2 wherein the mesh is a woven mesh of polyester fibers coated with nickel.

4. A planar multiple switch as claimed in claim 1 wherein there is included another planar conductor on the substrate, means electrically joining the another conductor to the conductive planar member, and terminal means for each of the plurality of conductive patterns and another conductor on the substrate.

5. A planar multiple switch having high frequency capability comprising
    a substrate of an electrically insulative material having a supporting face,
    a plurality of planar electrically conductive patterns mounted on the face of the substrate,
    each of said conductive patterns forming switch contact means,
    a flexible resilient electrically conductive planar member extending over the plurality of conductive patterns,
    spacing means mounting the conductive planar member above the conductive patterns so that depression of a selected portion of the conductive planar member engages such depressed portion with at least one of the conductive patterns, said conductive planar member being formed of fine conductive elements electrically joined together and sufficiently spaced apart to form non-conductive areas between the conductive elements such that the non-conductive areas have a size exceeding the area occupied by the conductive elements to substantially reduce capacitive coupling between the conductive planar member and the conductive patterns, said plurality of planar electrically conductive patterns including first areas where single conductors are exposed for engagement, and including second areas between respective first areas where a plurality of conductive fingers from the respective adjacent conductors are interlaced so that at least two conductors are engaged by the depression of the conductive planar member.

6. A planar multiple switch having high frequency capability comprising a substrate of an electrically insulative material having a supporting face;

a plurality of planar electrically conductive patterns mounted on the face of the substrate;

each of said conductive patterns forming switch contract means;

a flexible resilient electrically conductive planar member extending over the plurality of conductive patterns;

spacing means mounting the conductive planar member above the conductive patterns so that depression of a selected portion of the conductive planar member engages such depressed portion with at least one of the conductive patterns;

said conductive planar member being formed of fine conductive elements electrically joined together and sufficiently spaced apart to form non-conductive areas between the conductive elements such that the non-conductive areas have a size exceeding the area occupied by the conductive elements to substantially reduce capacitive coupling between the conductive planar member and the conductive patterns; and said plurality of planar electrically conductive patterns including a plurality of parallel lines, insulative material selectively covering sections of the lines, and conductive material selectively raising other adjacent sections of the lines to a height at least equal to or above the insulative portions of the lines to form a pattern of coded contacts.

* * * * *